(12) United States Patent
Lee et al.

(10) Patent No.: US 11,469,459 B2
(45) Date of Patent: Oct. 11, 2022

(54) CATHODE OF METAL AIR BATTERY, METAL AIR BATTERY INCLUDING THE SAME, AND METHOD OF MANUFACTURING THE SAME

(71) Applicants: Samsung Electronics Co., Ltd., Suwon-si (KR); Myongji University Industry and Academia Cooperation, Yongin-si (KR)

(72) Inventors: Dongjoon Lee, Suwon-si (KR); Jeonggil Seo, Yongin-si (KR); Alan Christian Lim, Yongin-si (KR); Jungock Park, Yongin-si (KR)

(73) Assignees: SAMSUNG ELECTRONICS CO., LTD., Gyeonggi-Do (KR); MYONGJI UNIVERSITY INDUSTRY AND ACADEMIA COOPERATION, Gyeonggi-Do (KR)

( * ) Notice: Subject to any disclaimer, the term of this patent is extended or adjusted under 35 U.S.C. 154(b) by 60 days.

(21) Appl. No.: 17/036,316

(22) Filed: Sep. 29, 2020

(65) Prior Publication Data
US 2021/0249716 A1    Aug. 12, 2021

(30) Foreign Application Priority Data
Feb. 7, 2020    (KR) .................... 10-2020-0015205

(51) Int. Cl.
*H01M 12/06*    (2006.01)
*H01M 4/38*    (2006.01)
*H01M 4/485*    (2010.01)
*H01M 12/08*    (2006.01)

(52) U.S. Cl.
CPC .......... *H01M 12/06* (2013.01); *H01M 4/382* (2013.01); *H01M 4/485* (2013.01); *H01M 12/08* (2013.01)

(58) Field of Classification Search
CPC ................ H01M 12/06; H01M 12/08; H01M 4/38–382; H01M 4/485
See application file for complete search history.

(56) References Cited

U.S. PATENT DOCUMENTS

| 2014/0255799 | A1 | 9/2014 | Anandan et al. |
| 2015/0372358 | A1* | 12/2015 | Izumi ................... H01M 12/08 429/405 |
| 2016/0049646 | A1* | 2/2016 | Fujiki ................... H01M 4/366 429/231.95 |
| 2016/0248100 | A1 | 8/2016 | Joo et al. |

FOREIGN PATENT DOCUMENTS

| KR | 10-1008899 B1 | 1/2011 |
| KR | 10-1375214 B1 | 3/2014 |
| KR | 10-1816366 B1 | 1/2018 |
| KR | 1020180074837 A | 7/2018 |
| KR | 1020190004012 A | 1/2019 |

* cited by examiner

*Primary Examiner* — Karie O'Neill Apicella
(74) *Attorney, Agent, or Firm* — Cantor Colburn LLP

(57) ABSTRACT

A cathode of a metal-air battery includes an electrically conductive metal oxide in a three-dimensional (3D) network structure,
  wherein the electrically conductive metal oxide of the three-dimensional network structure is in a form of a plurality of strands,
  wherein a strand of the plurality of strands has an aspect ratio in a range of about 10 to about $10^7$, and
  wherein the three-dimensional network structure has a porosity of about 70 volume percent to about 95 volume percent, based on a total volume of the three-dimensional network structure.

20 Claims, 6 Drawing Sheets

CATHODE OF METAL AIR BATTERY, METAL AIR BATTERY INCLUDING THE SAME, AND METHOD OF MANUFACTURING THE SAME

CROSS-REFERENCE TO RELATED APPLICATION

This application claims priority to and the benefit of Korean Patent Application No. 10-2020-0015205, filed on Feb. 7, 2020, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode of a metal air battery, a metal air battery including the same, and a method of manufacturing the cathode.

2. Description of the Related Art

Metal air batteries are expected to be widely used in various applications because of their high energy density and high electromotive force.

A lithium air battery includes a lithium metal anode and a cathode using oxygen in air as an active material. Reduction and oxidation of oxygen take place in the cathode, while oxidation and reduction of lithium take place in the anode. The lithium air battery converts chemical energy generated by the oxidation and reduction into electrical energy and outputs electrical energy. For example, the lithium air battery absorbs oxygen during discharge, and emits oxygen during charge. Also, because the lithium air battery uses oxygen present in the air, the energy density of the lithium air battery may be several times higher than that of a lithium ion battery.

The capacity or performance of the lithium air battery may vary according to the material and composition of a cathode. Research has been conducted into a lithium air battery that includes a cathode using a lithium-containing metal oxide as a mixed conductor and has both ionic conductivity and electrical conductivity. However, a mixed conductor having a relatively high density may have an insufficient space for storing materials generated during discharge, which may adversely affect the capacity of the lithium air battery. In order to provide a space for storing discharge products, the porosity of a cathode has been increased. However, when porosity is increased, the internal resistance of the cathode may be undesirably increased. Thus there remains a need for an improved cathode material.

SUMMARY

Provided is a cathode capable of achieving a high capacity and having low resistance.

Provided is a method of manufacturing the cathode.

Still another aspect provides a metal air battery comprising the cathode.

Additional aspects will be set forth in part in the description which follows and, in part, will be apparent from the description.

According to an aspect, provided is a cathode of a metal air battery including: an electrically conductive metal oxide in a three-dimensional (3D) network structure, wherein the electrically conductive metal oxide of the three-dimensional network structure is in a form of a plurality of strands, wherein a strand of the plurality of strands has an aspect ratio in a range of about 10 to about $10^7$, and wherein the three-dimensional network structure has a porosity of about 70 volume percent to about 95 volume percent, based on a total volume of the three-dimensional network structure.

The electrically conductive metal oxide may comprise a lithium-containing metal oxide.

The lithium-containing metal oxide may include at least one lanthanide element, and at least one transition metal element.

The lanthanide element may be lanthanum (La) and the transition metal element may be ruthenium (Ru).

The lithium-containing metal oxide may include $Li_xLa_yRu_zO_3$ wherein $0.2<x\leq0.7$, $0.2<y\leq0.7$, $0<x+y<1$, and $0<z<1.2$.

The 3D network structure may have a porosity of about 70% to about 90%.

The 3D network structure may have a pore size of about 100 nanometers (nm) to 10 micrometers (μm).

Strands of the 3D network structure may have an aspect ratio in a range of about 10 to about $1\times10^5$.

The strands of the 3D network structure may have a diameter of about 10 nm to about 10 μm.

The strands of the 3D network structure may have a length of about 1 μm to about 10 m.

The 3D network structure may have an overall thickness of about 1 μm to about 500 μm, wherein the overall thickness is determined orthogonal to a major surface of the three-dimensional network structure.

The electrical conductivity of the cathode may be about $1\times10^{-5}$ siemens per centimeter (S/cm) to about 1 S/cm.

The lithium ionic conductivity of the cathode may be about $1\times10^{-5}$ S/cm to about $1\times10^{-2}$ S/cm.

According to an aspect, a method of manufacturing a cathode includes:

providing a composition including an electrically conductive metal oxide, a polymer and a solvent;

disposing the composition on to a base material to form a preliminary network structure;

heat-treating the preliminary network structure to remove the polymer from the preliminary network structure to form a three-dimensional (3D) network structure including the electrically conductive metal oxide to manufacture the cathode, wherein the electrically conductive metal oxide of the three-dimensional network structure is in a form of a plurality of strands, wherein a strand of the plurality of strands has an aspect ratio in a range of about 10 to about $10^7$, and wherein the three-dimensional network structure has a porosity of about 70 volume percent to about 95 volume percent, based on a total volume of the three-dimensional network structure to manufacture the cathode.

The electrically conductive metal oxide may comprise a lithium-containing metal oxide.

The weight of the electrically conductive metal oxide may be in a range of about 65 weight percent (wt %) to about 85 (wt %), relative to the total weight of the electrically conductive metal oxide and the polymer.

The lithium-containing metal oxide may include at least one lanthanide element, and at least one transition metal element.

The lithium-containing metal oxide may include lanthanum (La) and ruthenium (Ru).

Examples of the polymer may include at least one of polyurethane, polyether urethane, a polyurethane copolymer, cellulose acetate, cellulose acetate butylate, cellulose acetate propionate, polymethylmethacrylate (PMMA), polymethylacrylate (PMA), a polyacrylic copolymer, polyacrylonitrile (PAN), polyvinylacetate (PVAc), a polyvinylacetate copolymer, polyvinyl alcohol (PVA), polyperfuryl alcohol (PPFA), polystyrene, a polystyrene copolymer, polyether sulfone (PSF), polyethylene, polyethylene glycol, polyethylene oxide (PEO), polypropylene oxide (PPO), a polyethylene oxide copolymer, polypropyleneoxide copolymer, polycarbonate (PC), polyvinylacetate, polyvinylchloride (PVC), polycaprolactone, polyvinylpyrrolidone (PVP), polyvinyl fluoride, a polyvinylidene fluoride copolymer, or polyamide.

The solvent may include dimethyl formamide (DMF), acetone, tetrahydrofuran (THF), toluene, or a mixed solution thereof.

Drying the preliminary network structure may further be performed prior to heat-treating the preliminary network structure.

The heat-treating may be performed at a temperature of about 300° C. to about 600° C.

The electrically conductive metal oxide may be sintered by the heat treatment.

The spinning may include electro-spinning, melt-blowing, flash spinning, or electrostatic melt-blowing.

According to an aspect, a metal air battery includes:

a cathode including a cathode current collector and a three-dimensional (3D) network structure disposed on the cathode current collector, wherein the three-dimensional (3D) network structure includes an electrically conductive metal oxide;

an anode including a metal, a metal alloy, or a combination thereof; and an electrolyte disposed between the cathode and the anode.

The metal in the anode may be lithium.

The electrolyte may be a solid electrolyte.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
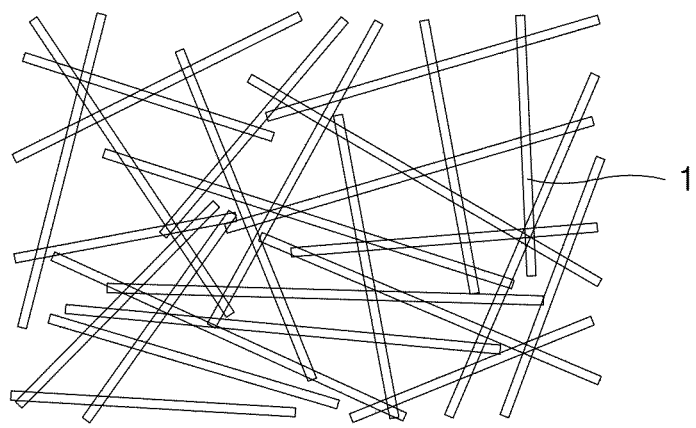
FIG. 1 is a schematic view illustrating a structure of a cathode according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Or" means "and/or." Expressions such as "at least one of," when preceding a list of elements, modify the entire list of elements and do not modify the individual elements of the list.

Hereinafter, as the present inventive concept allows for various changes and numerous embodiments, particular embodiments will be illustrated in the drawings and described in detail in the detailed description. However, this is not intended to limit the present inventive concept to particular modes of practice, and it is to be appreciated that all changes, equivalents, and substitutes that do not depart from the spirit and technical scope are encompassed in the present inventive concept.

The terminology used herein is for the purpose of describing particular example embodiments only and is not intended to be limiting of the present inventive concept. As used herein, the singular forms are intended to include the plural forms, unless the context clearly indicates otherwise. As used herein, it is to be understood that the terms such as "includes," "have," and "comprise" are intended to indicate the presence of the features, numbers, steps, actions, components, parts, ingredients, materials, or combinations thereof disclosed in the specification, but do not preclude the possibility that one or more other features, numbers, steps, actions, components, parts, ingredients, materials, or combinations thereof may exist or may be added. The symbol "/" used herein may be interpreted as "and" or "or" according to the context.

In the drawings, the diameters, lengths, and thicknesses of layers and regions are exaggerated or reduced for clarity. Throughout the specification, like reference numerals refer to like elements. Throughout the specification, it is to be understood that when a component, such as a layer, a film, a region, or a plate, is referred to as being "on" another component, the component can be directly on the other component or intervening components may be present thereon. Throughout the specification, the terms "first," "second," etc. may be used to describe various elements, these elements, components, regions, layers and/or sections should not be limited by these terms. These terms are only used to distinguish one element from another element.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized sense unless expressly so defined herein. Also, the terms will not be interpreted in an overly formal sense unless expressly so defined herein Example embodiments of inventive concepts are described herein with reference to cross-sectional illustrations that are schematic illustrations of idealized embodiments of example embodiments. As such, variations from the shapes of the illustrations as a result, for example, of manufacturing techniques and/or tolerances, are to be expected. Thus, example embodiments of inventive concepts should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

As referred to herein, lanthanide elements are lanthanum, cerium, praseodymium, neodymium, promethium, samarium, europium, gadolinium, terbium, dysprosium, holmium, erbium, thulium, ytterbium, and lutetium.

As referred to herein, transition metal elements are scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, lawrencium, rutherfordium, dubnium, seaborgium, bohrium, hassium, meitnerium, darmstadtium, roentgenium, and copernicium.

Hereinafter, a cathode according to an exemplary embodiment, a lithium air battery including the same, and a manufacturing method thereof will be described in further detail.

Cathode

A cathode according to an embodiment is configured to use oxygen as a cathode active material and includes an electrically conductive metal oxide having a three-dimensional (3D) network or mesh structure. FIG. 1 is a schematic view illustrating a structure of a cathode according to an embodiment. Referring to FIG. 1, an electrically conductive metal oxide 1 constitutes a three-dimensional (3D) network or mesh structure.

The electrically conductive metal oxide 1 may include a metal oxide not containing lithium (i.e., a lithium-free metal oxide) or a lithium-containing metal oxide. The electrically conductive metal oxide 1 may be an electrical conductor having electrical conductivity or a mixed conductor having both ionic conductivity and electrical conductivity.

The lithium-free metal oxide may be, for example, a transition metal oxide or a lanthanide oxide. The metal in the transition metal oxide or the lanthanide oxide may include ruthenium (Ru), palladium (Pd), iridium (Ir), cobalt (Co), nickel (Ni), iron (Fe), silver (Ag), manganese (Mn), platinum (Pt), gold (Au), copper (Cu), aluminum (Al), chrome (Cr), titanium (Ti), molybdenum (Mo), tungsten (W), vanadium (V), lanthanum (La), or a combination thereof.

The lithium-containing metal oxide may further include a first metal element that includes at least one lanthanide element and a second metal element that includes at least one transition metal element. Each of the first metal element and the second metal element may be one or more metal elements.

Specifically, the first metal element may be at least one of La, Ce, Pr, Nd, Pm, Sm, Eu, Gd, Tb, Dy, Ho, Er, Tm, Yb or Lu, and the second metal element may be at least one of Ti, Pd, Pb, Fe, Ir, Co, Rh, Mn, Cr, Ru, Re, Sn, V, Ge, W, Zr, Ti, Mo, Hf, Nb, Ta, Bi, Y, Sc, Zn, Ga, Ag, Cd, Pt, Au, or Pb. For example, the first metal element may be lanthanum (La), and the second metal element may be ruthenium (Ru). For example, the lithium-containing metal oxide may be a metal oxide containing Li, La and Ru. For example, the lithium-containing metal oxide may be LiLaRuO, wherein the stoichiometric ratio of Li, La, Ru and O is in the range in which the lithium-containing metal oxide may have electrical conductivity and ionic conductivity. For example, the lithium-containing metal oxide may be $Li_xLa_yRu_zO_3$, wherein $0.2<x\leq0.7$, $0.2<y0.7$, $0<x+y<1$, and $0<z<1.2$, but is not limited thereto.

The lithium-containing metal oxide may be, for example, a crystalline lithium ion conductor. The lithium-containing metal oxide provides lithium ion migration paths by including lithium in its crystal structure. Therefore, the lithium-containing metal oxide is a lithium ion conductor. When the lithium-containing metal oxide is a lithium ion conductor, the cathode may not need to further include a separate electrolyte.

The network structure of the electrically conductive metal oxide has a porosity of about 70 volume percent (vol %) or more. Specifically, the network structure of the electrically conductive metal oxide may have a porosity in a range of about 70 vol % to about 95 vol %, about 70 vol % to about 90 vol % or about 70 vol % to about 80 vol %, wherein the porosity is a percentage of the volume of pores in the network structure, based on a total volume of the network structure. The network structure of the electrically conductive metal oxide may have a pore size in a range of, for example, about 10 nanometers (nm) to about 10 micrometers (μm), about 20 nm to about 5 μm, about 50 nm to about 1 μm, about 100 nm to about 500 nm, or about 200 nm to about 400 nm.

The network structure may include strands and may be fiber-like strands. A plurality of the fiber-like strands connected to each other may constitute the network structure. Strands in the network structure of the electrically conductive metal oxide may have a diameter of, for example, about 10 nm to about 10 μm about 20 nm to about 5 μm, about 50 nm to about 1 μm, about 100 nm to about 500 nm, or about 200 nm to about 400 nm. The strands of the network structure of the electrically conductive metal oxide may have a length of, for example, about 1 nm to about 10 μm, about 5 nm to about 5 μm, about 10 nm to about 1 μm, about 50 nm to about 500 nm, about 100 nm to about 400 nm, or about 200 nm to about 300 nm. The electrically conductive metal oxide strands of the 3D network structure may have an aspect ratio in a range of about $1 \times 10^1$ to about $1 \times 10^7$, for example, about $1 \times 10^1$ to about $1 \times 10^5$, about $1 \times 10^1$ to about $1 \times 10^3$, or about $1 \times 10^1$ to about $1 \times^2$. When the electrically conductive metal oxide includes fiber-like strands connected to each other, the cathode may have a high porosity and may maintain high electrical conductivity and ionic conductivity at the same time.

In the cathode of a metal air battery, a metal oxide as a discharge product is generated during discharge. The metal oxide as a discharge product is reduced to a metal by a reverse reaction during charge. If a large amount of the discharge product is generated, the capacity of the metal air battery may be increased. The discharge product is generated in voids (pores) provided in the cathode. However, in a cathode of a prior art metal air battery, the cathode may not have a sufficient volume of voids (pores) for storing a discharge product despite having a high density of an electrically conductive metal oxide as a cathode material because the amount of the discharge product generated is reduced, thereby lowering the capacity of the metal air battery. In order to increase the capacity by forming a sufficient volume of the discharge product, the porosity of the cathode may be increased. However, when the porosity is increased in a cathode, the conductivity of the cathode may be lowered, resulting in increased internal resistance. However, the current inventors surprisingly found that low internal resistance can be maintained, while achieving a high capacity due to a sufficient volume of pores, by using fiber-like strands constituting a 3D network structure in a cathode so that conduction pathways can be established by the network structure.

When the cathode material is, for example, a lithium-containing metal oxide, the electrical conductivity of the cathode may be in a range of about $1 \times 10^{-8}$ S/cm to about 1 S/cm, for example, about $1 \times 10^{-7}$ S/cm to about $1 \times 10^{-1}$ S/cm, or about $5 \times 10^{-8}$ S/cm to about $5 \times 10^{-2}$ S/cm. In addition, when the cathode material is, for example, a lithium-containing metal oxide, the lithium ionic conductivity of the cathode may be in a range of about $1 \times 10^{-8}$ S/cm to about $1 \times 10^{-2}$ S/cm, for example, about $1 \times 10^{-7}$ S/cm to about $1 \times 10^{-3}$ S/cm, or about $5 \times 10^{-8}$ S/cm to about $5 \times 10^{-4}$ S/cm.

The cathode having the 3D network structure may have a thickness in a range of, for example, about 1 μm to about 500 μm, wherein the thickness is determined orthogonal to a major surface of the three-dimensional network structure. The major surface of the three-dimensional network structure extends from a first point to a second point and the thickness is measured in a direction orthogonal to the first point, the second point, or a point on the straight line between the first point and the second point.

Fabrication method of Cathode

Figure 2:
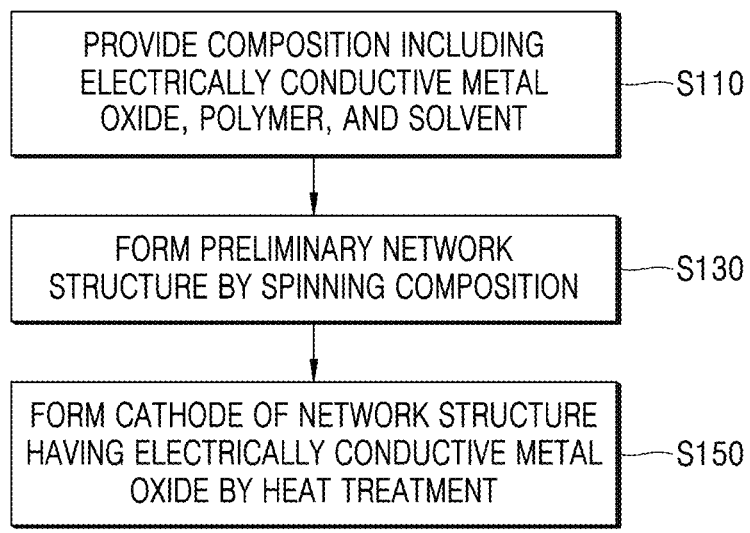
FIG. 2 is a flowchart schematically illustrating a method of manufacturing a cathode according to an embodiment.

FIG. 2 is a flowchart schematically illustrating a fabrication method of a cathode according to an embodiment. Referring to FIG. 2, a spinning composition including electrically conductive metal oxide powder, a polymer and a solvent, is prepared (S110).

The electrically conductive metal oxide in the composition is one of constituents of the cathode, and may be in the form of a powder. As to a description of the electrically conductive metal oxide, reference can be made to the description of the cathode. The electrically conductive metal oxide powder may have a particle diameter of, for example, about 10 nm to about 10 μm, about 50 nm to about 5 μm, or about 100 nm to about 1 μm.

The polymer contained in the composition is a component that is used in forming the network structure of the electrically conductive metal oxide and is then removed. An example thereof may be a polymer that is electro-spun to form fibers and is removed by heat, a chemical reaction, or an organic solvent. Examples of the polymer may include at least one of polyurethane, polyether urethane, a polyurethane copolymer, cellulose acetate, cellulose acetate butylate, cellulose acetate propionate, polymethylmethacrylate (PMMA), polymethylacrylate (PMA), a polyacrylic copolymer, polyacrylonitrile (PAN), polyvinylacetate (PVAc), a polyvinylacetate copolymer, polyvinyl alcohol (PVA), polyperfuryl alcohol (PPFA), polystyrene, a polystyrene copolymer, polyether sulfone (PSF), polyethylene, polyethylene glycol, polyethylene oxide (PEO), polypropylene oxide (PPO), a polyethylene oxide copolymer, polypropyleneoxide copolymer, polycarbonate (PC), polyvinylacetate, polyvinylchloride (PVC), polycaprolactone, polyvinylpyrrolidone (PVP), polyvinyl fluoride, a polyvinylidene fluoride copolymer, or polyamide. However, the polymer is not limited to those listed herein, and any suitable polymer may be used without limitation as long as it is capable of forming fibers using electro-spinning. As the polymer, PMMA, PAN or PSF, for example, may be used.

The solvent is a material for forming the spinning composition by dispersing the lithium-containing metal oxide and the polymer therein. The solvent may be volatilized while being electro-spun to then be removed. Examples of the solvent may include, but are not limited to, dimethyl formamide (DMF), acetone, tetrahydrofuran (THF), toluene, or a mixed solution thereof.

The weight of the electrically conductive metal oxide in the composition may be about 65 weight percent (wt %) or more and about 90 wt % or less, for example, about 65 wt % or more and about 85 wt % or less, or about 70 wt % or more and about 80 wt % or less, based on a total weight of the electrically conductive metal oxide and the polymer. When the weight percent of the electrically conductive metal oxide is within these ranges, the network structure including the electrically conductive metal oxide may be retained.

The electrically conductive metal oxide and the polymer in the spinning composition may be homogenously mixed by, for example, ultrasonic treatment.

A preliminary network structure, in which the polymer and the electrically conductive metal oxide are mixed, is formed by spinning the composition on a base material (S130).

For disposing the composition, electro-spinning, melt-blowing, flash spinning, or electrostatic melt-blowing may be used.

In an aspect, disposing may comprise spinning, where spinning may comprise electro-spinning or flash-spinning.

The preliminary network structure may be formed by, for example, electrospinning the composition. An electrospinning device may include a spinning nozzle connected to a metering pump for quantitatively injecting the spinning composition, a high-voltage generator, and an electrode for forming a layer of electro-spun fibers. A metal plate of a base material is grounded and used as an anode, and the spinning nozzle equipped with a pump for adjusting an ejection quantity per hour is used as a cathode. Then, for example, a voltage of about 10 kilovolts (kV) to about 20 kV, about 12 kV to about 18, kV, or about 14 kV to about 16 kV, is applied and the spinning composition is electro-spun onto the base material while adjusting the ejection rate of the composition to about 0.5 milliliters per minute (mL/min) to about 1.0 mL/min.

The base material may be, for example, a cathode current collector, a separator, or a solid electrolyte layer. The cathode current collector may be, for example, a gas diffusion layer and the gas diffusion layer may be, for example porous carbon paper, or a metal, such as gold, nickel, stainless steel, and may in the form of a mesh.

The separator may be any separator having a composition that is suitable for use as a base material. For example, a polymer non-woven fabric such as a polypropylene non-woven fabric or a polyphenylene sulfide non-woven fabric, a porous film of an olefin resin such as polyethylene or polypropylene, glass fibers, or a combination of the foregoing, may be used as the separator.

The current collector may be, for example a carbon-based current collector.

The polymer is removed from the preliminary network structure by heat-treating the preliminary network structure, thereby forming a cathode having a 3D network structure including an electrically conductive metal oxide (S150).

The temperature and atmosphere for heat-treating may be appropriately selected in consideration of the type of a polymer used and the temperature at which the polymer thermally decomposes. The heat-treating may be performed at a temperature in a range of, for example, about 300° C. to about 600° C. For example, a PMMA or PAN polymer may be removed by performing heat treatment at about 500° C., and a PSF polymer may be removed by performing heat treatment at about 600° C. The preliminary network structure may be dried prior to the heat treatment.

The polymer is thermally decomposed and removed by the heat treatment, and the preliminary network structure including the lithium-containing metal oxide and the polymer is sintered, thereby forming the 3D network structure.

Metal Air Battery

A metal air battery according to an embodiment includes the cathode; an anode including a metal, a metal alloy or a combination thereof; and an electrolyte disposed between the cathode and the anode. The metal air battery may have increased capacity and internal conductivity by employing the cathode having the 3D network structure.

The metal air battery includes the cathode, and the cathode is disposed on a cathode current collector, for example.

The cathode, as described herein, has the 3D network structure including the electrically conductive metal oxide. The cathode is permeable to gas, for example, oxygen or air. The oxygen or air easily diffuses into the cathode because the cathode is porous and/or permeable to gas. In addition, when the cathode uses a mixed conductor, an electrochemical reaction of the oxygen, ions and electrons can be easily carried out in the cathode by improved migration of ions and/or electrons.

The electrical conductivity and ionic conductivity of the metal air battery may be increased by further adding a commercially available conductive material to the cathode. For example, the conductive material may be porous. The air may easily penetrate into the conductive material because of the porosity of the conductive material. Any suitable material that has porosity and conductivity may be used, and examples thereof may include a porous carbonaceous material. Examples of the carbonaceous material may include, but are not limited to, carbon black, graphite, graphene, activated carbon, or carbon fiber, and any suitable carbonaceous material may be used. The conductive material may be, for example, a metallic material. The metallic material may be, for example, metal fiber, metal mesh or metal powder. The metal powder may be, for example, copper powder, silver powder, nickel powder, or aluminum powder. The conductive materials may be used alone or in combination.

The cathode may further include a catalyst for oxidation/reduction of oxygen. Examples of the catalyst may include, but are not limited to, a noble metal-based catalyst such as a platinum catalyst, a gold catalyst, a silver catalyst, a palladium catalyst, a ruthenium catalyst, a rhodium catalyst, or an osmium catalyst; an oxide-based catalyst such as manganese oxide, iron oxide, cobalt oxide, or nickel oxide; or an organic metal-based catalyst such as cobalt phthalocyanine, or any suitable oxidation/reduction catalyst of oxygen may be used.

For example, the catalyst may be supported in a carrier. Examples of the carrier may include an oxide carrier, a zeolite carrier, a clay mineral carrier, or a carbon carrier. Examples of the oxide carrier may include a metal oxide carrier including at least one of Al, Si, Zr, Ti, Ce, Pr, Sm, Eu, Tb, Tm, Yb, Sb, Bi, V, Cr, Mn, Fe, Co, Ni, Cu, Nb, Mo or W. Examples of the oxide carrier may include alumina, silica, zirconium oxide, or titanium dioxide. Examples of the carbon carrier may include carbon black such as ketjen black, acetylene black, channel black, or lamp black; graphite such as natural graphite, artificial graphite, or expanded graphite; activated carbon; or carbon fiber, but are not limited thereto, and any suitable carrier may be used.

The cathode may be formed on, for example, a base material. The base material may be, for example, a cathode current collector, a separator, or a solid electrolyte layer. The cathode current collector may be, for example, a gas diffusion layer.

The metal air battery includes an anode. The anode may include a metal, an alloy of the metal, or a combination thereof. Examples of the metal may include lithium, sodium, potassium, zinc, manganese, aluminum, iron, or silicon. For example, when the metal air battery is a lithium air battery, lithium, a lithium alloy, or a combination thereof may be used. For example, when the metal air battery is a zinc air battery, zinc, a zinc alloy, or a combination thereof may be used.

In the lithium air battery, the anode may be formed of, for example, a lithium metal thin film or a lithium based alloy thin film. The lithium based alloy may be, for example, alloys of lithium and aluminum, tin, magnesium, indium, calcium, potassium, titanium, or vanadium.

The metal air battery includes an electrolyte layer disposed between the cathode and the anode. The electrolyte layer of the lithium air battery may include a solid electrolyte.

The solid electrolyte may include, but is not limited to, at least one of a solid electrolyte including an ionically conducting inorganic material, a solid electrolyte including a polymeric ionic liquid (PIL) and a lithium salt, a solid electrolyte including an ionically conducting polymer and a lithium salt, a solid electrolyte including an electronically conducting polymer, or any suitable solid electrolyte.

The ionically conducting inorganic material may include, but is not limited to, at least one of a glass or amorphous metal ion conductor, a ceramic active metal ion conductor, a glass ceramic active metal ion conductor, or any suitable ionically conducting inorganic material. The ionically conducting inorganic material may be in the form of, for example, an ionically conducting inorganic particle or a sheet formed of the ionically conducting inorganic material.

Examples of the ionically conducting inorganic material may include at least one of $BaTiO_3$, $Pb(Zr_aTi_{1-a})O_3$ ($0 \le a \le 1$) (PZT), $Pb_{1-x}La_xZr_{1-y}Ti_yO_3$ (PLZT) (wherein $0 \le x < 1$ and $0 \le y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate (e.g., $Li_3PO_4$), lithium titanium phosphate (e.g., $Li_xTi_y(PO_4)_3$, wherein $0<x<2$ and $0<y<3$), lithium aluminum titanium phosphate (e.g., $Li_xAl_yTi_z(PO_4)_3$, $0<x<2$, $0<y<1$, and $0<z<3$), $Li_{1+x+y}(AlaGa_{1-a})_x(Ti_bGe_{1-b})_{2-x}Si_yP_{3-y}O_{12}$ (wherein $0 \le x \le 1$, $0 \le a \le 1$, and $0 \le b \le 1$), lithium lanthanum titanate (e.g., $Li_xLa_yTiO_3$, wherein $0<x<2$ and $0<y<3$), lithium germanium thiophosphate ($Li_xGe_yP_z$, $S_w$, $0<x<4$, $0<y<1$, $0<z<1$, and $0<w<5$), lithium nitride (e.g., $Li_xN_y$, wherein $0<x<4$ and $0<y<2$), $SiS_2$-based glass (e.g., $Li_xSi_yS_z$, wherein $0<_x<3$, $0<y<2$, and $0<z<4$), $P_2S_5$-based glass (e.g., $Li_xP_yS_z$, wherein $0<x<3$, $0<y<3$, and $0<z<7$), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, or a garnet-based ceramic (e.g., $Li_{3+x}La_3M_2O_{12}$, wherein M is one or more selected from tellurium (Te), niobium (Nb), and zirconium (Zr)).

Examples of the polymeric ionic liquid (PIL) may include: i) at least one of an ammonium-based cation, a pyrrolidinium-based cation, a pyridinium-based cation, a pyridinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation; and ii) at least one of $BF_4^-$, $PF_6^-$, $AsF_6^-$, $SbF_6^-$, $AlCl_4^-$, $HSO_4^-$, $ClO_4^-$, $CH_3SO_3$—, $CF_3CO_2^-$, $(CF_3SO_2)_2N^-$, $Cl^-$, $Br^-$, $I$—, $SO_4^-$, $CF_3SO_3$—, $(C_2F_5SO_2)_2N$—, $(C_2F_5SO_2)(CF_3SO_2)N$—, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2)_2PO$. Examples of the polymeric ionic liquid may include poly(diallyldimethylammonium trifluoromethanesulfonylimide) (poly(diallyldimethylammonium)TFSI), poly(1-allyl-3-methylimidazolium trifluoromethanesulfonylimide), or poly(N-methyl-N-propylpiperidinium bis(trifluoromethanesulfonyl)imide).

The ionically conducting polymer may include at least one ion conductive repeating unit of an ether-based monomer, an acrylic-based monomer, a methacrylic-based monomer, or a siloxane-based monomer.

Examples of the ionically conducting polymer may include, but are not limited to, polyethyleneoxide (PEO), polyvinyl alcohol (PVA), polyvinylpyrrolidone (PVP), polyvinylsulfone (polysulfone) polypropyleneoxide (PPO), polymethylmethacrylate, polyethylmethacrylate, polydimethyl siloxane, polyacrylic acid, polymethacrylic acid, polymethylacrylate, polyethylacrylate, poly-2-ethylhexyl acrylate, polybutyl methacrylate, poly-2-ethylhexylmethacrylate, polydecylacrylate, polyethylenevinylacetate, a phosphate ester polymer, polyester sulfide, and polyfluorovinylidene (PVdF), or Li-substituted Nafion. Any suitable ionically conducting polymer may be used.

Examples of the electronically conducting polymer may include, but are not limited to, a polyphenylene derivative or a polythiophene derivative, and any suitable electronically conducting polymer may be used.

The lithium air battery may further include, for example, a separator disposed between the cathode and the anode. The separator is not limited so long as it may have a composition which may function within an operational range of the lithium air battery. Examples of the separator may be a polymer non-woven fabric, such as a polypropylene non-woven fabric or a polyphenylene sulfide non-woven fabric, a porous film of an olefin-based resin, such as polyethylene or polypropylene, a glass fiber, or a combination of two or more of these materials.

The electrolyte layer may have, for example, a structure in which a solid polymer electrolyte is impregnated in the separator. For example, the electrolyte layer having a solid polymer electrolyte impregnated in the separator is prepared by disposing a solid polymer electrolyte film on one or both surfaces of the separator and press-rolling the resultant product.

The lithium air battery according to an embodiment may be formed by disposing an anode on one surface of a battery case, disposing an electrolyte layer on the anode, disposing a cathode on the electrolyte layer, disposing a porous cathode current collector on the cathode, disposing a pressing member on the porous cathode current collector to allow air to be transferred to an air electrode, and pressing the cathode current collector to form a cell. The case may be separable into an upper part contacting the anode and a lower part contacting the air electrode, and an insulating resin is disposed between the upper and lower parts, thereby electrically insulating the cathode and the anode from each other.

Figure 3:
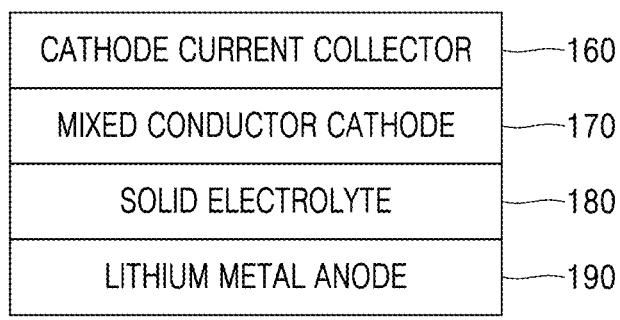
FIG. 3 is cross-sectional view schematically illustrating a layered structure between an anode and a cathode current collector of a lithium air battery according to an embodiment.

In the lithium air battery according to an embodiment, a layered structure between the anode and the cathode current collector is constructed such that an electrolyte layer is disposed on the anode made of a metal, a cathode including an electrically conductive metal oxide in a 3D network structure is disposed on the electrolyte layer, and the cathode current collector is disposed on the cathode. FIG. 3 is cross-sectional view schematically illustrating a layered structure between an anode and a cathode current collector of a lithium air battery. Referring to FIG. 3, a solid electrolyte 180 is disposed on a lithium metal anode 190 made, a mixed conductor cathode 170 is disposed on the solid electrolyte 180, and a cathode current collector 160 is disposed on the cathode. The anode, electrolyte, cathode and cathode current collector of the metal air battery are described herein.

The metal air battery may be used as both a primary battery and a secondary battery. The shape of the metal air battery is not limited, and the shape thereof may be, for example, a coin type, a button type, a sheet type, a laminated type, a cylindrical type, a flat type, or a horn type. The lithium air battery may also be used as a medium-sized or large-sized battery for an electric vehicle.

Figure 4:
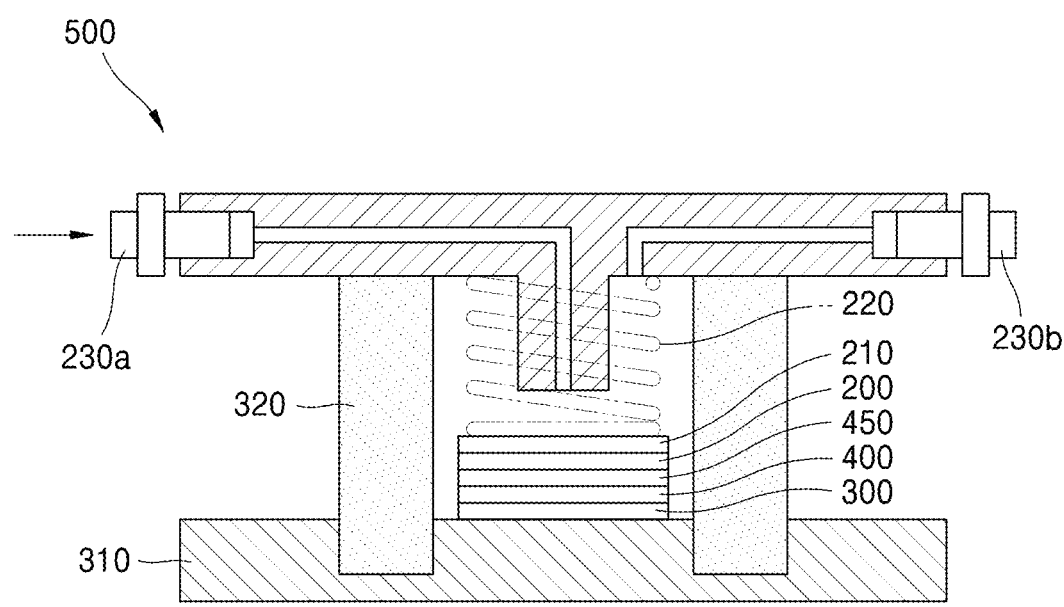
FIG. 4 is a schematic view illustrating a structure of a lithium air battery according to an embodiment.

FIG. 4 is a schematic view illustrating a structure of a lithium air battery according to an embodiment.

Referring to FIG. 4, a lithium air battery 500 has a structure including a first electrolyte layer 450 disposed between a cathode 200 using oxygen as an active material and disposed adjacent to a first current collector 210, and a lithium-containing anode 300 disposed adjacent to a second current collector 310. The first electrolyte layer 450 may be a lithium ion conducting solid electrolyte layer.

A second electrolyte layer 400 may be disposed between the anode 300 and the first electrolyte layer 450. The second electrolyte layer 400 may be a separator having a solid electrolyte impregnated therein. The first current collector 210 is porous and may perform a role as a gas diffusion layer enabling diffusion of air. A pressing member 220 for delivering air to the cathode is disposed on the first current collector 210.

A case 320 made of an insulating resin is disposed between the cathode 200 and the anode 300 to electrically separate the cathode 200 and the anode 300 from each other. Air is supplied via an air inlet 230a and exhausted via an air outlet 230b. The lithium air battery 500 may be manufactured in a stainless steel container.

The term "air" used with regard to a lithium air battery is not limited to atmospheric air, and may refer to a combination of gases including oxygen or pure oxygen gas. This broad definition of "air" may also be applied in other ways, such as an air battery or an air electrode.

The lithium air battery according to an embodiment may be advantageously applied to all areas employing secondary batteries.

Hereinafter, example embodiments will be described in further detail with reference to Examples and Comparative Examples. However, these examples are provided for illustrative purposes only, and the scope of the present disclosure shall not be limited thereto in any manner.

EXAMPLES

Preparation of Cathode of Lithium Air Battery

Experimental Example 1 (PAN)

To prepare $Li_{0.34}La_{0.55}RuO_3$ (LLRuO) powder as a cathode material, $Li_2CO_3$, $La_2O_3$, $RuO_2$ powder was added to ethanol according to the composition ratio of $Li_{0.34}La_{0.55}RuO_3$, and mixed. The content of ethanol was about 4 parts by weight, based on 100 parts by weight of $Li_2CO_3$, $La_2O_3$, and $RuO_2$ powder.

The mixture was placed into a ball-milling device, milled for four hours and then mixed. The resultant mixture was dried and then heat-treated at a heating rate of about 5° C./min up to a temperature of 1200° C., and followed by performing a heat-treatment at 1200° C. for four hours in an air atmosphere. The powder obtained by the heat treatment was subjected to grinding to obtain a powder of primary particles having a particle size of about 0.3 μm.

LLRuO powder, a polyacrylonitrile (PAN) polymer and a dimethylformamide (DMF) solvent were mixed at a weight ratio of LLRuO and PAN being 20:80 and at a weight ratio of PAN and DMF being 10:90. The resultant mixture liquid was ultrasonically mixed for four hours to make LLRuO and PAN homogenously disperse in DMF. The ultrasonically treated mixture liquid was injected into an electrospinning device. The mixture liquid was electro-spun onto an aluminum (Al) thin film at an ejection rate of 1 milliliter per hour (mL/h) while applying a voltage of 12 kilovolts (kV), at a distance of 15 cm between an ejection nozzle of the electrospinning device and a target substrate. The weight per unit area of LLRuO was 1 milligram per square centimeter ($mg/cm^2$). Layers formed by electrospinning were vertically pressed, thermally treated at 500° C. for four hours to remove the DMF solvent and the PAN polymer, followed by sintering LLRuO, thereby manufacturing an 8 μm thick cathode.

Experimental Examples 2 to 4 (PAN)

Cathodes were manufactured in the same manner as in Experimental Example 1, except that electrospinning of LLRuO was performed so as to have a weight per unit area of LLRuO being 1.5 $mg/cm^2$, 3 $mg/cm^2$, and 5 $mg/cm^2$, respectively.

Experimental Examples 5 to 8 (PMMA)

Cathodes were manufactured in the same manner as in Experimental Example 1, except that polymethylmethacrylate (PMMA) was used as a polymer, instead of PAN, a weight ratio of LLRuO:PMMA was 10:90, and electrospinning of LLRuO was performed so as to have a weight per unit area of LLRuO being 1 $mg/cm^2$, 1.5 $mg/cm^2$, 3 $mg/cm^2$, and 5 $mg/cm^2$, respectively.

Experimental Examples 9 to 12 (PSF)

Cathodes were manufactured in the same manner as in Experimental Example 1, except that polyethersulfone (PSF) was used as a polymer, instead of PAN, a weight ratio of LLRuO:PSF was 15:85, and electrospinning of LLRuO was performed so as to have a weight per unit area of LLRuO being 1 $mg/cm^2$, 1.5 $mg/cm^2$, and 3 $mg/cm^2$, and 5 $mg/cm^2$, respectively.

Experimental Example 13 (PAN)

A cathode was manufactured in the same manner as in Experimental Example 1, except that a weight ratio of LLRuO:PAN was 50:50, and electrospinning of LLRuO was performed so as to have a weight per unit area of LLRuO being 5 $mg/cm^2$.

Experimental Example 14 (PAN)

A cathode was manufactured in the same manner as in Experimental Example 1, except that a weight ratio of LLRuO:PAN was 70:30, and electrospinning of LLRuO was performed so as to have a weight per unit area of LLRuO being 3 $mg/cm^2$.

Experimental Example 15 (PAN)

A cathode was manufactured in the same manner as in Experimental Example 1, except that a weight ratio of LLRuO:PAN was 70:30, and electrospinning of LLRuO was performed so as to have a weight per unit area of LLRuO being 5 $mg/cm^2$.

Experimental Example 16 (PMMA)

A cathode was manufactured in the same manner as in Experimental Example 5, except that a weight ratio of LLRuO:PMMA was 40:60, and electrospinning of LLRuO was performed so as to have a weight per unit area of LLRuO being 3 mg/cm².

Experimental Example 17 (PMMA)

A cathode was manufactured in the same manner as in Experimental Example 5, except that a weight ratio of LLRuO:PMMA was 40:60, and electrospinning of LLRuO was performed so as to have a weight per unit area of LLRuO being 5 mg/cm².

Experimental Example 18 (PSF)

A cathode was manufactured in the same manner as in Experimental Example 9, except that a weight ratio of LLRuO:PSF was 30:70, and electrospinning of LLRuO was performed so as to have a weight per unit area of LLRuO being 5 mg/cm².

Experimental Example 19 (PSF)

A cathode was manufactured in the same manner as in Experimental Example 9, except that a weight ratio of LLRuO:PSF was 60:40, and electrospinning of LLRuO was performed so as to have a weight per unit area of LLRuO being 3 mg/cm².

Experimental Example 20 (PSF)

A cathode was manufactured in the same manner as in Experimental Example 9, except that a weight ratio of LLRuO:PSF was 60:40, and electrospinning of LLRuO was performed so as to have a weight per unit area of LLRuO being 5 mg/cm².

Evaluation Example 1: Cathode Shape

Figure 5A:
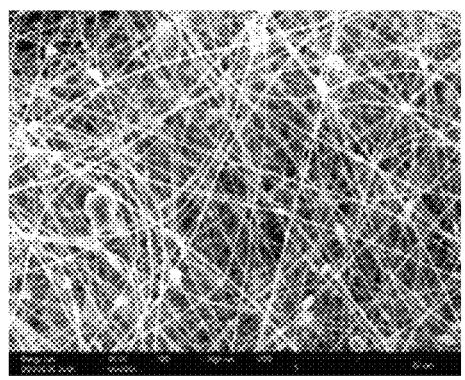
FIG. 5A is an SEM image that shows a cathode immediately after electro-spinning in Experimental Example 1.
Figure 5B:
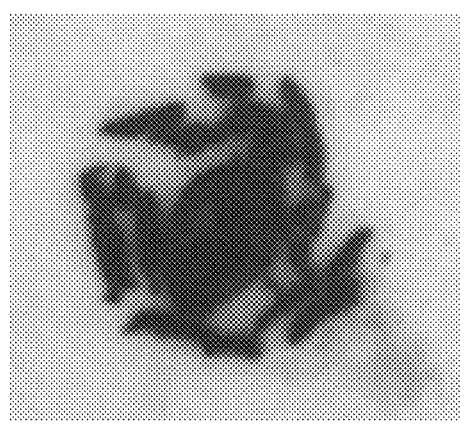
FIG. 5B is an optical microscope image of a cathode after electro-spinning and heat treatment in Experimental Example 1.
Figure 5C:
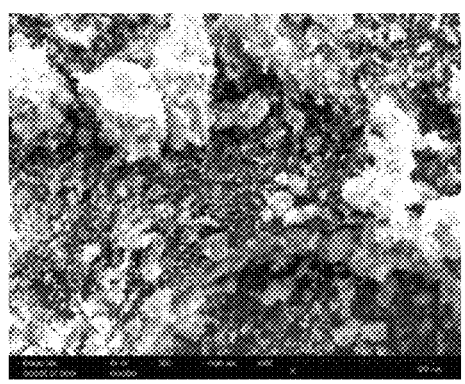
FIG. 5C is an SEM image of a cathode after electro-spinning and heat treatment in Experimental Example 1.

In Experimental Examples 1 to 13 and 16 to 20 in which the content of LLRuO in the mixture liquid was 60% or less, the network structure of each cathode collapsed after heat treatment. When the content of LLRuO was 70% or more in the cathode using a PAN polymer, the network structure was retained after heat-treatment. FIG. 5A illustrates an SEM image of a cathode immediately after electrospinning in Experimental Example 1, and FIGS. 5B and 5C illustrate an optical microscope image and an SEM image of a cathode after heat treatment preceded by electrospinning, respectively. Referring to the images of FIGS. 5A to 5C, it was confirmed that the cathode of Experimental Example 1 retained its network structure immediately after the electrospinning, but the network structure did not remain after the heat-treatment.

Figure 6A:
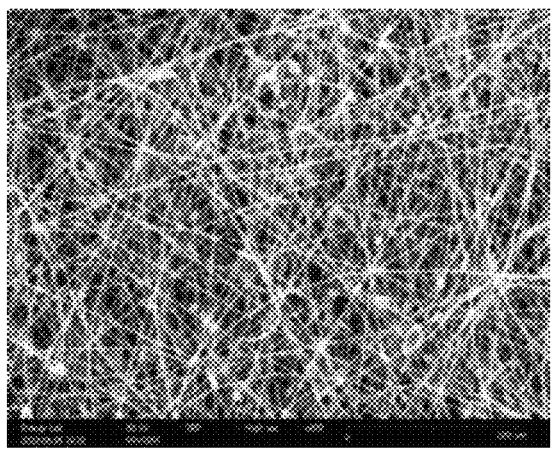
FIG. 6A is an SEM image of a cathode immediately after electro-spinning in Experimental Example 14.
Figure 6B:
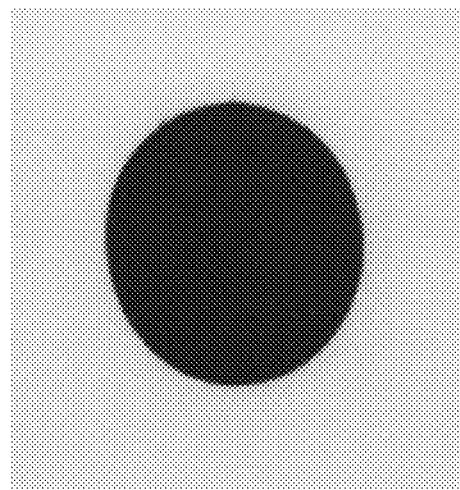
FIG. 6B is an optical microscope image of a cathode after electro-spinning and heat treatment in Experimental Example 14.
Figure 6C:
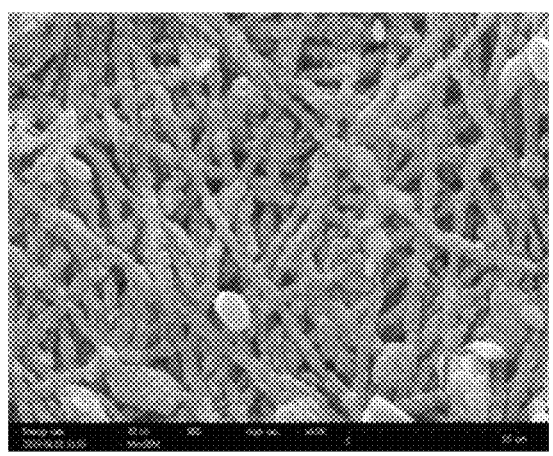
FIG. 6C is an SEM image of a cathode after electro-spinning and heat treatment in Experimental Example 14.
Figure 6D:
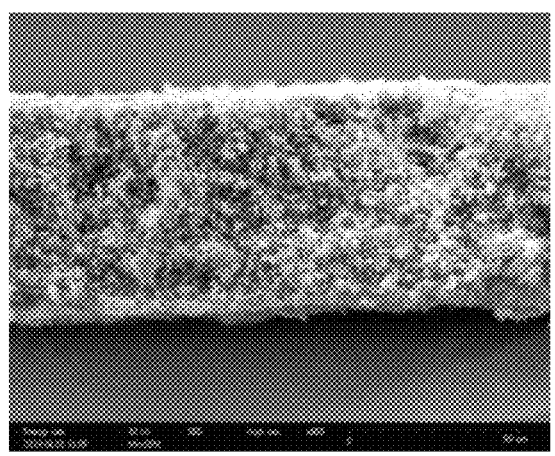
FIG. 6D is an SEM image of a cross-section of a cathode after electro-spinning and heat treatment in Experimental Example 14.

In Experimental Examples 14 and 15 in which the content of LLRuO in the mixture liquid was 70%, the network structure of each cathode was retained after the heat-treatment. FIG. 6A illustrates an SEM image of a cathode immediately after electrospinning in Experimental Example 14, and FIG. 6B and is an optical microscope image of a cathode after the heat treatment preceded by electrospinning in Experimental Example 14. FIG. 6C is an SEM image and FIG. 6D is a cross-section SEM image, of a cathode after the heat treatment preceded by electrospinning in Experimental Example 14. Referring to the images of FIGS. 6A to 6D, it was found and confirmed that the cathode of Experimental Example 14 retained its network structure after the electrospinning and heat-treatment.

Table 1 illustrates the conditions of the cathodes manufactured by electrospinning in Experimental Examples 1 to 20 and whether or not fiber shapes were retained in the network structure.

TABLE 1

| Experimental Example | Polymer | LLRuO content (%) | Spinning rate (mg/cm²) | Network structure |
|---|---|---|---|---|
| 1 | PAN | 20 | 1 | — |
| 2 | PAN | 20 | 1.5 | — |
| 3 | PAN | 20 | 3 | — |
| 4 | PAN | 20 | 5 | — |
| 5 | PMMA | 10 | 1 | — |
| 6 | PMMA | 10 | 1.5 | — |
| 7 | PMMA | 10 | 3 | — |
| 8 | PMMA | 10 | 5 | — |
| 9 | PSF | 15 | 1 | — |
| 10 | PSF | 15 | 1.5 | — |
| 11 | PSF | 15 | 3 | — |
| 12 | PSF | 15 | 5 | — |
| 13 | PAN | 50 | 5 | — |
| 14 | PAN | 70 | 3 | Retained |
| 15 | PAN | 70 | 5 | Retained |
| 16 | PMMA | 40 | 3 | — |
| 17 | PMMA | 40 | 5 | — |
| 18 | PSF | 30 | 5 | — |
| 19 | PSF | 60 | 3 | — |
| 20 | PSF | 60 | 5 | — |

Example 1

The cathode manufactured in Experimental Example 14 was used as a cathode of Example 1.

Comparative Example 1

A cathode was manufactured by mixing LLRuO (Li0.34La0.55RuO3) powder prepared in the same manner as in Experimental Example 1 and Butvar® B-79 as a polyvinyl butyral resin at a weight ratio of 7:3 and was then casted, and the resultant product was thermally treated at 500° C. for four hours.

Evaluation Example 2: Evaluation of Ionic Conductivity and Electrical Conductivity The porosity, electrical conductivity and ionic conductivity of the cathodes of Example 1 and Comparative Example 1 are summarized in Table 2.

TABLE 2

| | Porosity (%) | Electrical conductivity (S/cm) | Ionic conductivity (S/cm) | Ionic conductivity (S/cm) in the absence of porous network structure |
|---|---|---|---|---|
| Example 1 | 75 | $1.6 \times 10^{-2}$ | $8.53 \times 10^{-7}$ | $3.41 \times 10^{-6}$ |
| Comparative Example 1 | 35 | $1.4 \times 10^{-2}$ | $1.16 \times 10^{-6}$ | $1.79 \times 10^{-6}$ |

Referring to Table 2, the cathode of Example 1 has a higher porosity than the cathode of Comparative Example 1, and exhibits higher levels of both electrical conductivity and ionic conductivity compared to the cathode of Comparative Example 1. In Comparative Example 1, when the pores in cathode are expanded, breakage of interconnection of the cathode material distributed without directionality is increased, and thus, without wishing to be bound by theory, it is understood that the electrical conductivity and ionic conductivity are reduced. By contrast, in Example 1 in which the lithium-containing metal oxide as the cathode material are interconnected in the network structure, it is understood that high electrical conductivity and ionic conductivity can be maintained even if the porosity is increased.

Evaluation Example 3: Evaluation of Charge and Discharge Characteristics of Lithium Air Batteries The lithium air batteries of Example 1 and Comparative Example 1 were cycled such that discharging was performed at 60° C. in an oxygen atmosphere of 1 atm in a constant current mode at a current density of 0.3 mA/cm$^2$ with a voltage of 2.6 V (vs. Li) or cut-off of 3 mAh/cm$^2$, and then charged with the same current density until a voltage of 4.5 V was reached. The results of charge and discharge tests for the respective lithium air batteries at the first cycle are shown in FIG. 7.

Figure 7:
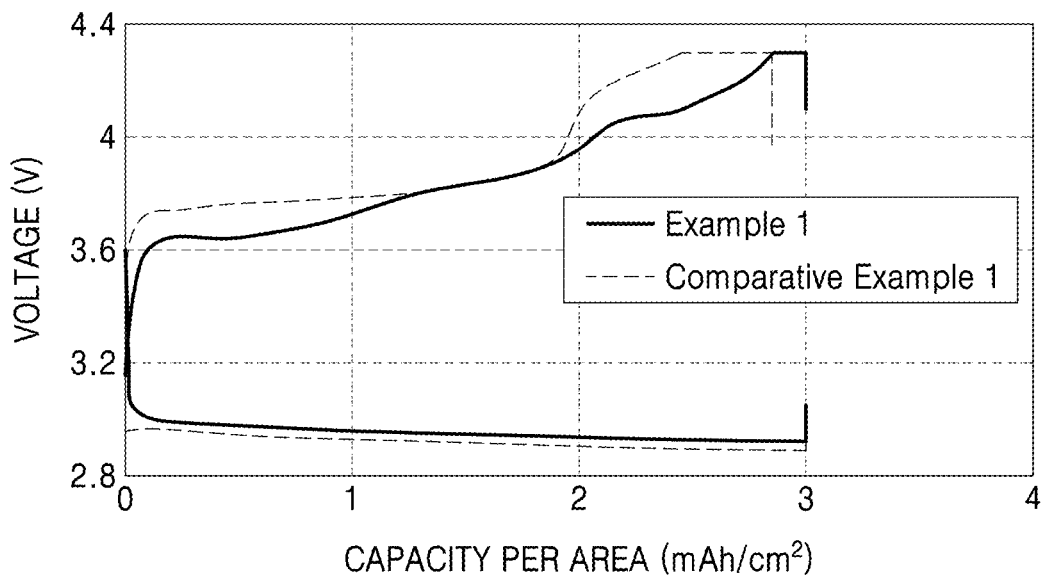
FIG. 7 is a graph of voltage (V) versus area normalized capacity (milliampere hours per square centimeter ($mAh/cm^2$)) and shows charge and discharge results for the first cycle of each of a lithium air battery of Example 1 and Comparative Example 1.

As shown in FIG. 7, it was confirmed that the lithium air battery of Example 1 exhibited a reduction in the overvoltage during charge and discharge, and the charge and discharge were reversibly performed, compared to the lithium air battery of Comparative Example 1. Without wishing to be bound by theory, this result is understood to be based on an improvement in the binding capacity between particles of cathode by the electrospinning employed in Example 1. From these results, it was confirmed that the lithium air battery of Example 1 has higher stability in operation than that of Comparative Example 1.

Meanwhile, the lithium air batteries of Example 1 and Comparative Example 1 were tested while performing charge and discharge cycles in the same manner as described above, and cycle numbers at which the discharge capacity of 3 mAh/cm$^2$ was maintained at 2.6 V (vs. Li), were measured. The results thereof are shown in FIG. 8.

Figure 8:
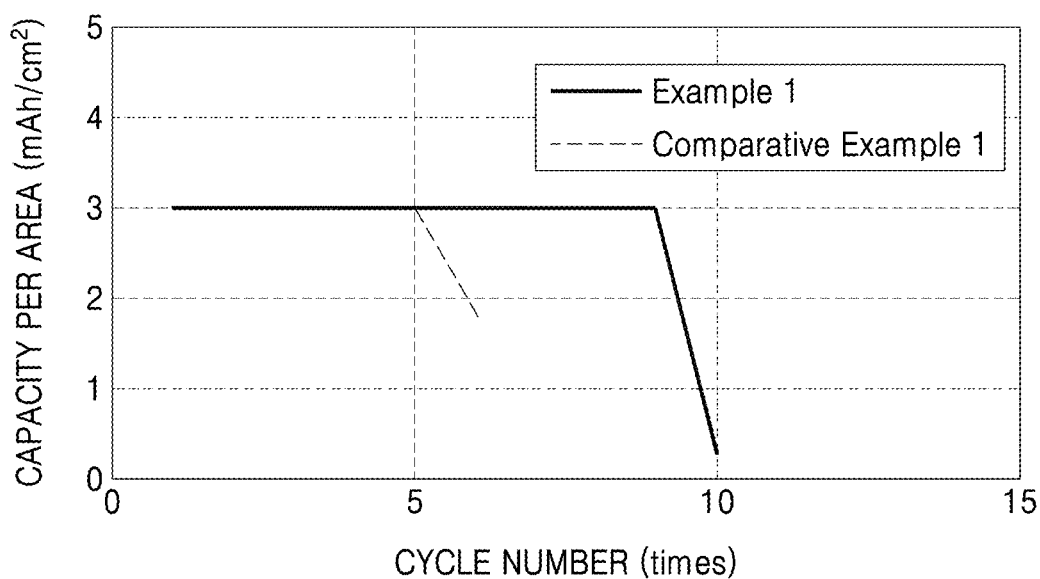
FIG. 8 is a graph of area normalized capacity ($mAh/cm^2$) versus cycle number (times) and shows the discharge capacity for a lithium air battery of Example 1 and Comparative Example 1.

As shown in FIG. 8, it was confirmed that the lithium air battery of Example 1 showed increased cycle numbers, compared to the lithium air battery of Comparative Example 1.

According to an aspect, the metal air battery comprising a cathode including an electrically conductive metal oxide having a network structure can maintain low resistance and can achieve a high capacity.

While one or more exemplary embodiments have been described with reference to the figures, the embodiments described herein have been presented by way of example only, and it will be appreciated by those skilled in the art that various changes and other equivalent embodiments may be made from the above description. Descriptions of features, aspects, or advantages within each embodiment should be considered as available for other similar features, aspects, or advantages in other embodiments. Therefore, the present disclosure should be defined by the spirit and scope of the appended claims.

What is claimed is:

1. A cathode of a metal air battery, the cathode comprising:
   an electrically conductive metal oxide in a three-dimensional network structure, wherein the electrically conductive metal oxide of the three-dimensional network structure is in a form of a plurality of strands,
   wherein a strand of the plurality of strands has an aspect ratio in a range of about 10 to about 10$^7$, and
   wherein the three-dimensional network structure has a porosity of about 70 volume percent to about 95 volume percent, based on a total volume of the three-dimensional network structure.

2. The cathode of claim 1, wherein the electrically conductive metal oxide comprises a lithium-containing metal oxide.

3. The cathode of claim 2, wherein the lithium-containing metal oxide comprises at least one lanthanide element and at least one transition metal element.

4. The cathode of claim 3, wherein the lanthanide element is lanthanum and the transition metal element is ruthenium.

5. The cathode of claim 4, wherein the lithium-containing metal oxide is Li$_x$La$_y$Ru$_z$O$_3$, wherein 0.2<x≤0.7, 0.2<y≤0.7, 0<x+y<1, and 0<z<1.2.

6. The cathode of claim 1, wherein the three-dimensional network structure has a porosity of about 70 volume percent to about 90 volume percent, based on a total volume of the three-dimensional network structure.

7. The cathode of claim 1, wherein a strand of the plurality of strands has an aspect ratio in a range of about 10 to about 10$^5$.

8. The cathode of claim 1, wherein the strands of the three-dimensional network structure has a diameter of about 10 nanometers to about 10 micrometers.

9. The cathode of claim 1, wherein the three-dimensional network structure has an overall thickness of about 1 micrometer to about 500 micrometers, wherein the overall thickness is determined orthogonal to a major surface of the three-dimensional network structure.

10. A method of manufacturing a cathode, the method comprising:
    providing a composition comprising an electrically conductive metal oxide, a polymer, and a solvent;
    disposing the composition on a base material to form a preliminary network structure;
    heat treating the preliminary network structure to remove the polymer from the preliminary network structure to form a three-dimensional network structure comprising the electrically conductive metal oxide,
    wherein the electrically conductive metal oxide of the three-dimensional network structure is in a form of a plurality of strands,
    wherein a strand of the plurality of strands has an aspect ratio in a range of about 10 to about 10$^7$, and
    wherein the three-dimensional network structure has a porosity of about 70 volume percent to about 95 volume percent, based on a total volume of the three-dimensional network structure to manufacture the cathode of claim 1.

11. The method of claim 10, wherein a content of the electrically conductive metal oxide in the composition is about 65 weight percent to about 85 weight percent, based on a total weight of the electrically conductive metal oxide and the polymer.

12. The method of claim 10, wherein the electrically conductive metal oxide comprises a lithium-containing metal oxide.

13. The method of claim 12, wherein the lithium-containing metal oxide comprises at least one lanthanide element and at least one transition metal element.

14. The method of claim 13, wherein the lanthanide element is lanthanum and the transition metal element is ruthenium.

15. The method of claim 10, wherein the polymer is at least one of polyurethane, polyether urethane, a polyurethane copolymer, cellulose acetate, cellulose acetate butylate, cellulose acetate propionate, polymethylmethacrylate, polymethylacrylate, a polyacrylic copolymer, polyacrylonitrile, polyvinylacetate, a polyvinylacetate copolymer, polyvinyl alcohol, polyperfuryl alcohol, polystyrene, a polystyrene copolymer, polyether sulfone, polyethylene, polyethylene glycol, polyethylene oxide, polypropylene oxide, a polyethylene oxide copolymer, polypropyleneoxide copolymer, polycarbonate, polyvinylacetate, polyvinylchloride, polycaprolactone, polyvinylpyrrolidone, polyvinyl fluoride, a polyvinylidene fluoride copolymer, or polyamide.

16. The method of claim 10, wherein the disposing the composition on a base material comprises at least one of electro-spinning, melt-blowing, flash spinning, or electrostatic melt-blowing.

17. A metal air battery comprising:
   the cathode according to claim 1;
      an anode comprising a metal, a metal alloy, or a combination thereof; and
      an electrolyte disposed between the cathode and the anode.

18. The metal air battery of claim 17, wherein the metal is lithium.

19. The method of claim 15, wherein the polymer is at least one of polymethylmethacrylate, polyacrylonitrile, or polyether sulfone.

20. The method of claim 10, wherein the electrically conductive metal oxide of the three-dimensional network structure has a weight per unit area of about 1 milligram per square centimeter to about 5 milligrams per square centimeter.

\* \* \* \* \*